US012278417B2

United States Patent

Raybern et al.

(12) United States Patent
(10) Patent No.: US 12,278,417 B2
(45) Date of Patent: Apr. 15, 2025

(54) APPARATUS FOR MOUNTING A TRANSCEIVER RADIO UNIT TO A COMPONENT OF A CELLULAR COMMUNICATION SYSTEM

(71) Applicant: DISH Wireless L.L.C., Englewood, CO (US)

(72) Inventors: Brandon Raybern, Castle Rock, CO (US); Richard Ripp, Jr., Castle Rock, CO (US)

(73) Assignee: DISH Wireless L.L.C., Englewood, CO (US)

(*) Notice: Subject to any disclaimer, the term of this patent is extended or adjusted under 35 U.S.C. 154(b) by 0 days.

(21) Appl. No.: 18/184,610

(22) Filed: Mar. 15, 2023

(65) Prior Publication Data

US 2023/0307815 A1 Sep. 28, 2023

Related U.S. Application Data

(63) Continuation of application No. 17/223,514, filed on Apr. 6, 2021, now Pat. No. 11,626,655.

(Continued)

(51) Int. Cl.

*H01Q 1/24* (2006.01)
*H01Q 1/12* (2006.01)
*H01Q 3/04* (2006.01)

(52) U.S. Cl.

CPC ......... *H01Q 1/1207* (2013.01); *H01Q 1/1264* (2013.01); *H01Q 3/04* (2013.01)

(58) Field of Classification Search

CPC .. H01Q 1/1207; H01Q 1/1264; H01Q 1/1221; H01Q 1/146; H01Q 3/04

See application file for complete search history.

(56) References Cited

U.S. PATENT DOCUMENTS 3,606,019 A * 9/1971 Dubeil .................. H02B 1/042 361/627
4,050,663 A 9/1977 Rogers (Continued)

FOREIGN PATENT DOCUMENTS

WO 2011119613 A1 9/2011
WO 2020072880 A1 4/2020

OTHER PUBLICATIONS

ISA-USPTO, International Search Report issued in IA No. PCT/US2021/071696, dated Dec. 23, 2021.

(Continued)

*Primary Examiner* — Awat M Salih
(74) *Attorney, Agent, or Firm* — KW Law, LLP

(57) ABSTRACT

A universal mounting apparatus suitable for use with a cellular communication system is disclosed here. The mounting apparatus can be used to mount a transceiver radio unit to an antenna structure. The mounting apparatus includes a first mounting plate compatible with the antenna structure, a second mounting plate couplable to the first mounting plate and slidably adjustable relative to the first mounting plate. Openings in the second mounting plate are arranged in a pattern compatible with different possible mounting fastener locations for transceiver radio units. At least one adjustment fastener couples the mounting plates together. When the at least one adjustment fastener is loosened, position of the second mounting plate is adjustable relative to the first mounting plate. When the at least one adjustment fastener is tightened, position of the second mounting plate is locked relative to the first mounting plate.

20 Claims, 15 Drawing Sheets

Related U.S. Application Data

(60) Provisional application No. 63/087,986, filed on Oct. 6, 2020.

(56) References Cited

U.S. PATENT DOCUMENTS

| | | | |
|---|---|---|---|
| 7,106,273 | B1 | 9/2006 | Brunson et al. |
| 10,390,386 | B2 | 8/2019 | Hendrix et al. |
| 2017/0252240 | A1* | 9/2017 | DuFresne ............ A61G 5/1067 |
| 2018/0108978 | A1* | 4/2018 | Gonsowski .............. H01Q 1/42 |
| 2019/0058239 | A1 | 2/2019 | Smith |
| 2020/0388907 | A1* | 12/2020 | Colapietro ............. H01Q 1/246 |

OTHER PUBLICATIONS

Supplementary European Search Report for EP Application No. 21878714.1 dated Jan. 4, 2024 (5 pages).

* cited by examiner

APPARATUS FOR MOUNTING A TRANSCEIVER RADIO UNIT TO A COMPONENT OF A CELLULAR COMMUNICATION SYSTEM

PRIORITY CLAIM

This application is a continuation of U.S. patent application Ser. No. 17/223,514 filed on Apr. 6, 2021, which claims the benefit of U.S. Provisional Patent Application Ser. No. 63/087,986 filed on Oct. 6, 2020. Both of these applications are incorporated herein by reference.

TECHNICAL FIELD

Embodiments of the subject matter described herein relate generally to an apparatus, device, or system used to mount a first component to a second component. For example, embodiments of a mounting apparatus can be utilized to mount a transceiver radio unit (RU) of a cellular communication system base station to another component or support structure. More particularly, embodiments of the mounting apparatus are configured to be universally compatible with RUs manufactured by different vendors such that the RUs can be quickly and easily mounted to a component, such as an antenna of the base station.

BACKGROUND

A cellular communication system includes base stations (also known as cell sites) distributed throughout a geographical region. A base station includes equipment such as an antenna, mounting and support structure, one or more transceiver radio units (RUs), and the like. In some deployments, an RU can be mounted to the housing, frame, or shell of an antenna. A cellular system provider usually has control over the specifications and dimensions of its antenna components and related support architecture. In contrast, however, a cellular system provider may source the RUs from different vendors or manufacturers. Consequently, the system provider may have little to no control over the design, configuration, dimensions, and/or mounting features of sources RUs. Accordingly, different RUs may, but need not, be compatible with the mounting features and specifications of the antenna components. Mounting incompatibilities can present significant challenges, require custom mounting hardware, and/or require additional installation time in the field.

BRIEF SUMMARY

Disclosed here is a universal mounting apparatus to mount a transceiver radio unit to a component of a cellular communication system. An exemplary embodiment of the universal mounting apparatus includes: a first mounting plate having features compatible with a guide rail system of the component, the features configured to slide within channels defined in the guide rail system; at least one adjustment slot formed in the first mounting plate; a second mounting plate couplable to the first mounting plate; openings formed in the second mounting plate, the openings arranged in a first pattern compatible with different possible mounting fastener locations for transceiver radio units; and at least one adjustment fastener to facilitate slidable adjustment of the second mounting plate relative to the first mounting plate, the at least one adjustment slot accommodating the at least one adjustment fastener. When the at least one adjustment fastener is loosened, position of the second mounting plate is movable relative to the first mounting plate. When the at least one adjustment fastener is tightened, position of the second mounting plate is locked relative to the first mounting plate.

Also disclosed is an embodiment of a system having: a transceiver radio unit; a support structure of a cellular communication system; and a universal mounting apparatus to mount the transceiver radio unit to the support structure. The universal mounting apparatus includes: a first mounting plate having mounting features compatible with the support structure; at least one adjustment slot formed in the first mounting plate; a second mounting plate couplable to the first mounting plate; openings formed in the second mounting plate, the openings arranged in a first pattern compatible with different possible mounting fastener locations for transceiver radio units; and at least one adjustment fastener to facilitate slidable adjustment of the second mounting plate relative to the first mounting plate. The at least one adjustment slot accommodates the at least one adjustment fastener. When the at least one adjustment fastener is loosened, position of the second mounting plate is movable relative to the first mounting plate. When the at least one adjustment fastener is tightened, position of the second mounting plate is locked relative to the first mounting plate.

Also disclosed is a universal mounting apparatus to mount a transceiver radio unit to an antenna structure of a cellular communication system. Exemplary embodiments of the universal mounting apparatus include: a first mounting plate having mounting features compatible with the antenna structure; a second mounting plate couplable to the first mounting plate and slidably adjustable such that position of the second mounting plate is moveable relative to the first mounting plate; openings formed in the second mounting plate, the openings arranged in a pattern compatible with different possible mounting fastener locations for transceiver radio units; and at least one adjustment fastener to couple the first and second mounting plates together. When the at least one adjustment fastener is loosened, position of the second mounting plate is adjustable relative to the first mounting plate. When the at least one adjustment fastener is tightened, position of the second mounting plate is locked relative to the first mounting plate.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
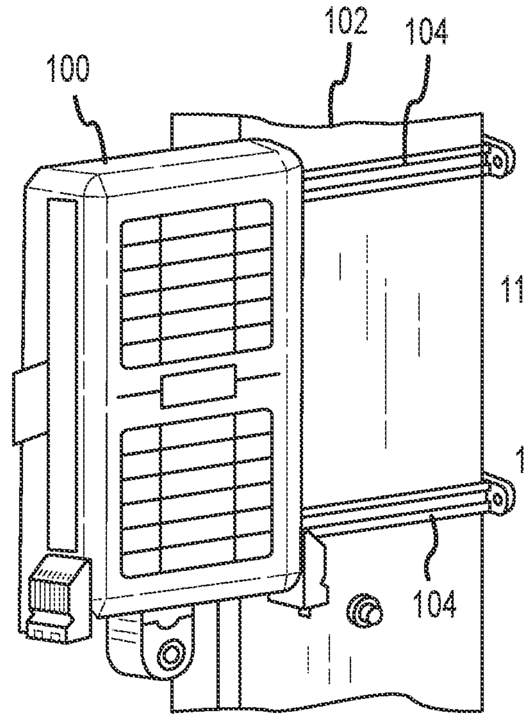
FIG. 1 is a perspective view of an RU, an antenna structure, and a guide rail system for mounting the RU to the antenna structure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

It should be understood that various aspects disclosed herein may be combined in different ways than the arrangements specifically presented in the description and accompanying drawings.

The subject matter disclosed here relates to a "universal" mounting apparatus that facilitates mounting of a first component (e.g., the mounted component) to a second component (e.g., the supporting component). Embodiments of the mounting apparatus can be designed and configured to accommodate mounting of various types of components to various types of support structures. In accordance with the non-limiting examples shown and described here, the mounting apparatus accommodates the mounting of a transceiver RU of a cellular communication system to an appropriate support structure, such as an antenna structure of the cellular communication system. It should be appreciated that embodiments of the mounting apparatus can be specifically designed for compatibility with other applications, deployments, mountable components, and support structures.

FIG. 1 is a perspective view that depicts an RU 100, a section of an antenna structure 102, and a guide rail system 104 of the antenna structure. The guide rail system 104 is configured and arranged for mounting the RU 100 to the antenna structure 102. FIG. 1 depicts the RU 100 in an initial position during installation. Although hidden from view in FIG. 1, the RU 100 includes or cooperates with roller wheels (or any suitably configured device, fixture, or feature that is compatible with the guide rail system 104) that slide within channels defined in the individual guides of the guide rail system 104. In FIG. 1, the roller wheels of the RU 100 allow the RU 100 to slide to the right until the RU 100 is positioned in its final mounting location. The guide rail system 104 supports the weight of the RU 100, and holds the RU 100 in the proper location, which may be necessary to establish and maintain certain mechanical and/or electrical connections between the RU 100 and the antenna structure 102. After the RU 100 is installed in the desired position, it can be secured or locked in place such that it cannot slide within the guide rail system 104.

Figure 2:
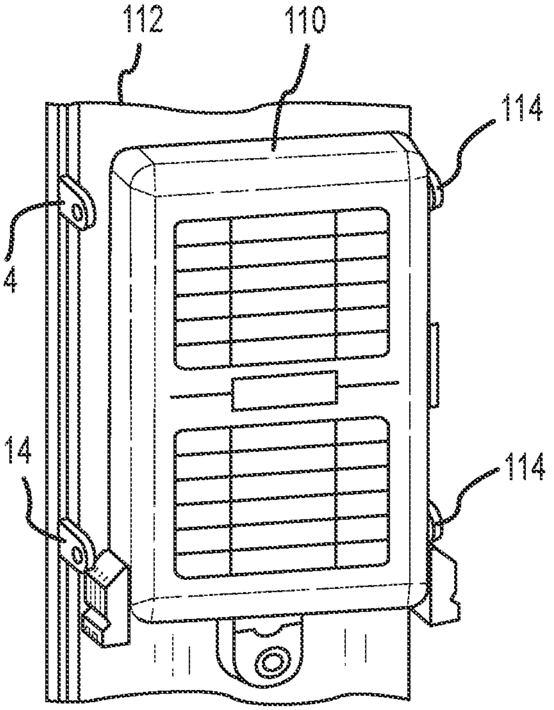
FIG. 2 is a perspective view of an RU, an antenna structure, and a fastener system for mounting the RU to the antenna structure.

FIG. 2 shows an alternative arrangement that does not utilize a guide rail system. FIG. 2 is a perspective view that depicts an RU 110, a section of an antenna structure 112, and a fastener system 114 for mounting the RU 110 to the antenna structure 112. The fastener system 114 may include threaded bolts or studs extending from the mounting surface of the antenna structure 112, which mate with holes, slots, keyholes, or voids formed in the RU 110 or formed in a mounting plate secured to the RU 110. This allows the RU 110 to be hung on the extending bolts and secured to the antenna structure 112 using nuts, lugs, or locks. The fastener system 114 supports the weight of the RU 110, and holds the RU 110 in the proper location, which may be necessary to establish and maintain certain mechanical and/or electrical connections between the RU 110 and the antenna structure 112.

Figure 3:
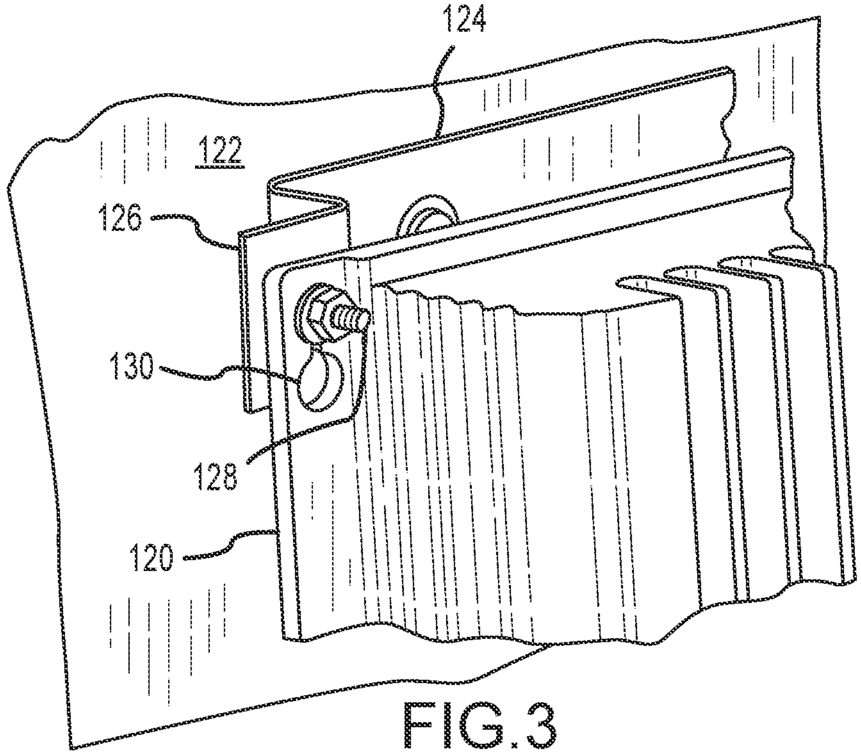
FIG. 3 is a perspective view of a portion of an RU, a support structure, and a mounting bracket.

FIG. 3 is a perspective view that shows a portion of an RU 120, a support structure 122, and a mounting bracket 124. The mounting bracket 124 is bolted to the support structure 122. The mounting bracket 124 includes offset flanges 126 that function to keep the RU 120 a certain distance away from the support structure 122. In this regard, the flanges 126 are offset away from the surface of the support structure 122. Each flange 126 has a threaded fastener 128 extending in the direction away from the support structure 122. The threaded fastener 128 fits inside a slot, keyhole 130, or suitably configured void that is formed in the housing of the RU 120 (or formed in a mounting plate or element that is attached to the RU 120). The arrangement depicted in FIG. 3 could be used as the fastener system 114 of FIG. 2.

Figure 4:
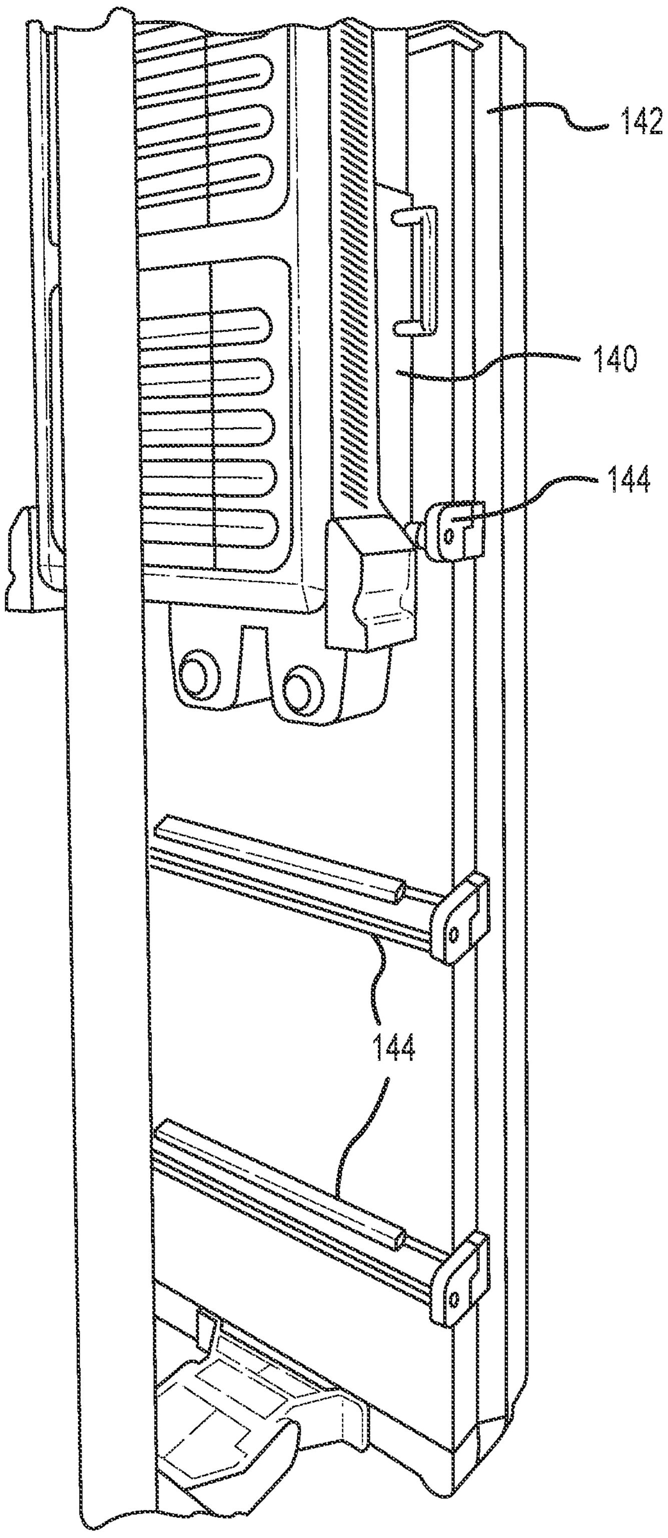
FIG. 4 is a perspective view of an RU mounted to an antenna structure.
Figure 5:
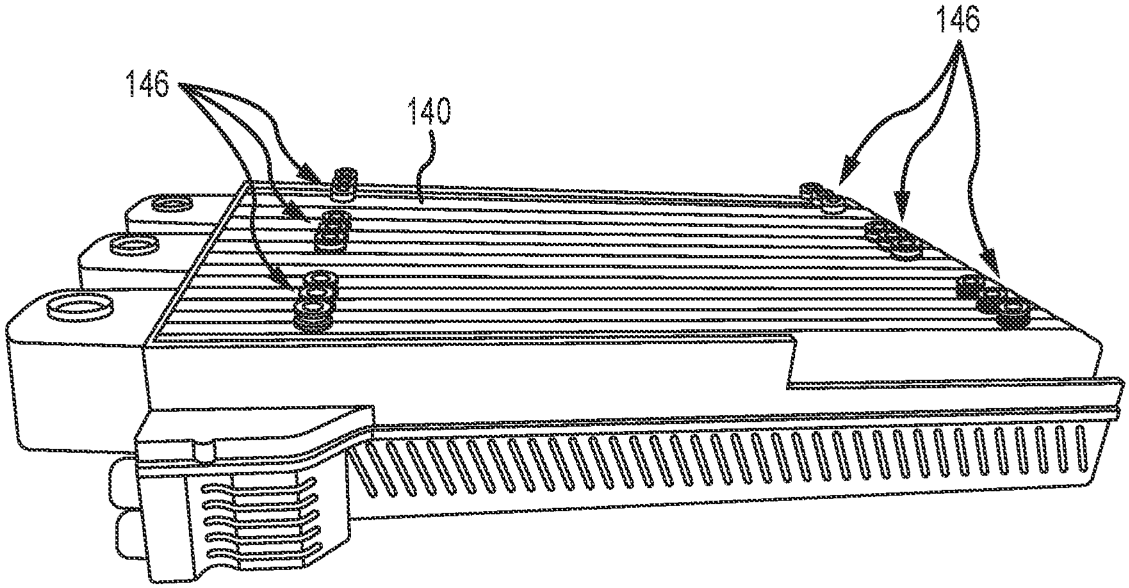
FIG. 5 is a perspective view of the back side of an RU having mounting wheels configured in two rows for compatibility with two mounting rails.

FIG. 4 is a perspective view of an RU 140 mounted to a portion of an antenna structure 142. In FIG. 4, the RU 140 is mounted to the antenna structure 142 using a guide rail system 144. Although only one RU 140 is depicted in FIG. 4, the guide rail system 144 may be designed to accommodate installation of two or more RUs on the antenna structure 142. FIG. 5 is a perspective view of the back side of the RU 140. For the illustrated embodiment, the RU 140 includes two parallel rows of roller wheels 146 affixed directly to the back side of the RU 140. The roller wheels 146 must be arranged for compatibility with the positions of the two guide rails of the antenna structure 142. Consequently, the antenna structure 142 and the RU 140 must be cooperatively designed and manufactured according to consistent specifications.

The embodiments of the mounting apparatus presented here include mounting features that are "RU agnostic" in that the mounting apparatus can be attached to different RU components (which may be manufactured by different suppliers/vendors, and which may have mounting holes, mounting inserts, fasteners, and/or mounting features arranged in different layouts, patterns, or orientations). Accordingly, the universal mounting apparatus disclosed here is compatible with a variety of different RU components, and serves as an interface between an RU component and its support structure. This description assumes that the mounting features of the support structure (e.g., guide rails, threaded inserts, threaded fasteners, keyholes, slots, or the like) are arranged in a known, specified, fixed, or standardized layout such that the universal mounting apparatus includes a simple design for purposes of mating with the support structure. In certain embodiments, however, the universal mounting apparatus can be configured to accommodate a variety of different support structure designs. In other words, the universal mounting apparatus can be both RU agnostic and support structure agnostic if so desired.

Figure 6:
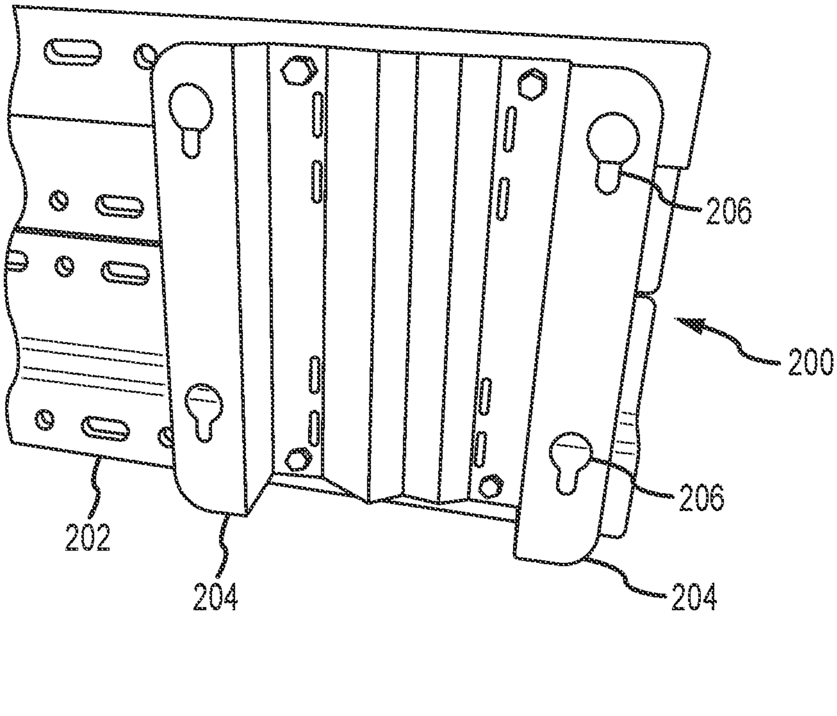
FIG. 6 is a perspective view of an embodiment of a universal mounting apparatus having a keyhole mounting feature.

FIG. 6 is a perspective view of an embodiment of a universal mounting apparatus 200 having keyhole mounting features. FIG. 6 shows the rear/back of only a portion of the mounting apparatus 200. The rear/back side of the mounting apparatus 200 faces the support structure (not shown); the front side of the mounting apparatus 200 faces the RU (not shown). The depicted embodiment includes a universal mounting plate 202, offset flanges 204, and keyholes 206 formed in the offset flanges 204. Although not always required, each flange 204 includes two keyholes 206 formed therein. The mounting plate 202 may also include a similar arrangement of flanges 204 (not shown in FIG. 6) at the opposite end. In other words, the left side of the mounting plate 202 (which is hidden from view in FIG. 6) may include two offset flanges 204, each having two keyholes 206. The front side of the mounting plate 202 includes slots, holes, and/or openings arranged in a pattern or layout that contemplates and is compatible with different possible fastener positions of available RU components. In this regard, the layout of slots, holes, and/or openings is compatible with a variety of different fastener locations and, therefore, the mounting plate 202 is RU agnostic. Depending on the particular embodiment, the mounting plate 202 and the flanges 204 may be integrally formed as a one-piece component, or they can be fabricated as two physically distinct parts that are attached, coupled, or otherwise affixed to each other.

Figures 7A, 7B, 7C, 7D:
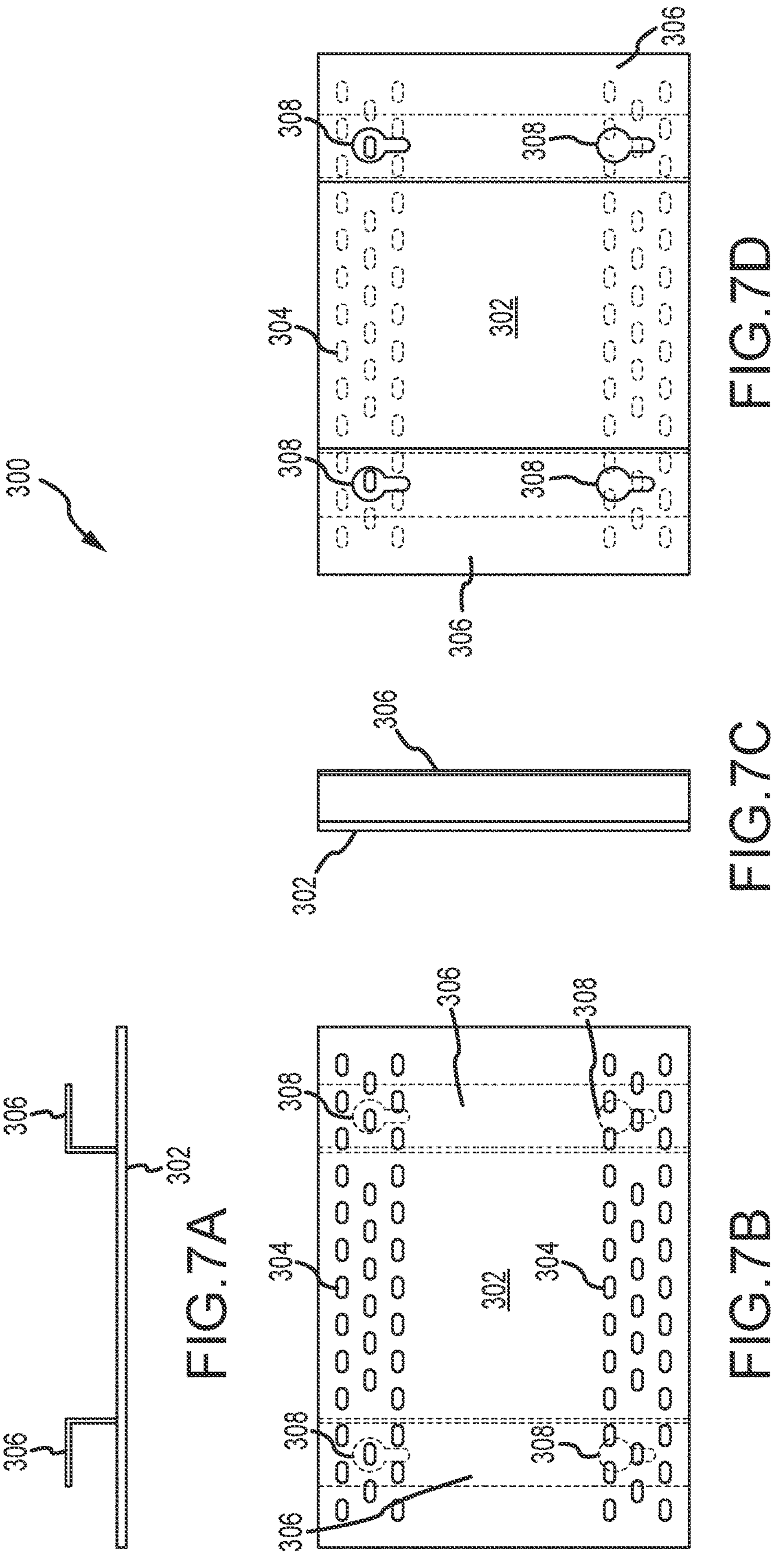
FIGS. 7A-D include plan (FIG. 7A), front (FIG. 7B), side (FIG. 7C), and back (FIG. 7D) views of an embodiment of a universal mounting apparatus having a keyhole mounting feature.
Figure 10:
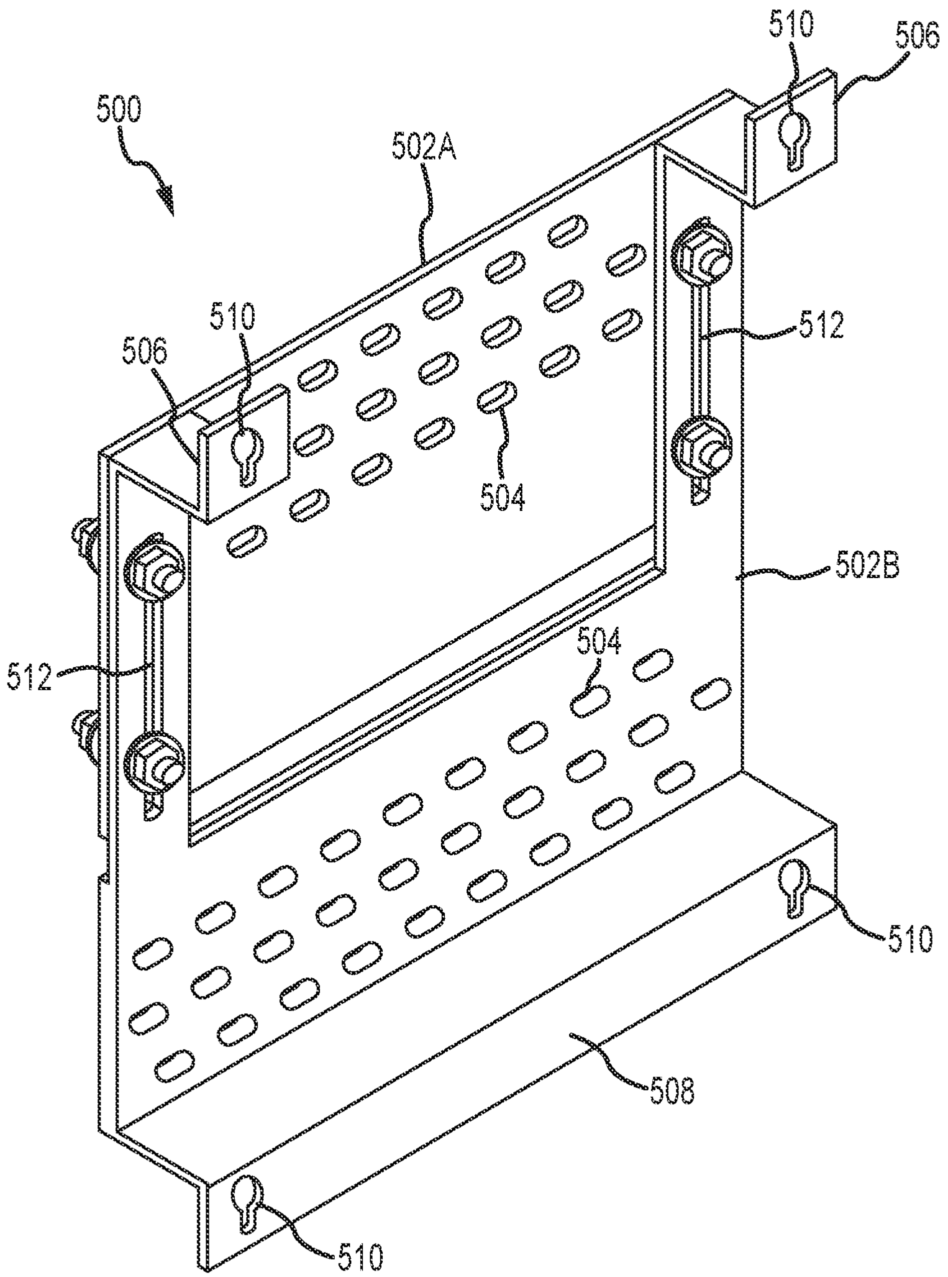
FIG. 10 is a rear perspective view of an embodiment of a universal mounting apparatus having a keyhole mounting feature and an adjustable mounting plate.

FIG. 7 includes plan (FIG. 7A), front (FIG. 7B), side (FIG. 7C), and back (FIG. 7D) views of an embodiment of a universal mounting apparatus 300 having keyhole mounting features. Although FIG. 7 does not include a rear perspective view, FIG. 10 is a rear perspective view of a similar mounting apparatus. Referring to FIG. 7, the mounting apparatus 300 generally includes, without limitation: a universal mounting plate 302 that defines the front surface or portion of the mounting apparatus 300; holes 304 formed in the mounting plate 302; offset flanges 306 that run vertically in the front, side, and back views of FIG. 7; and holes 308 (e.g., slots or keyholes) formed in the offset flanges 306. The holes 304 are arranged in an appropriate pattern or array that is intended to accommodate a plurality of different RU fastener locations, as explained above. In certain embodiments, the holes 304 are generally arranged in an upper and lower array, although the holes 304 could be formed and distributed throughout the entirety of the mounting plate 302. The offset flanges 306 protrude from the back side of the mounting plate 302, such that the RU will be offset from the support structure after installation. See, for example, FIG. 10, which depicts similar keyhole flanges extending from the back side of the mounting plate. The universal nature of the holes 304 allows the mounting apparatus 300 to compatibly mount to the RU component using, for example, threaded fasteners. Thereafter, the RU component can be mounted to the support structure (e.g., antenna structure) using the holes 308. Thereafter, the RU component can be secured to the support structure using nuts, clips, locks, clamps, or the like.

Figures 8A, 8B, 8C, 8D:
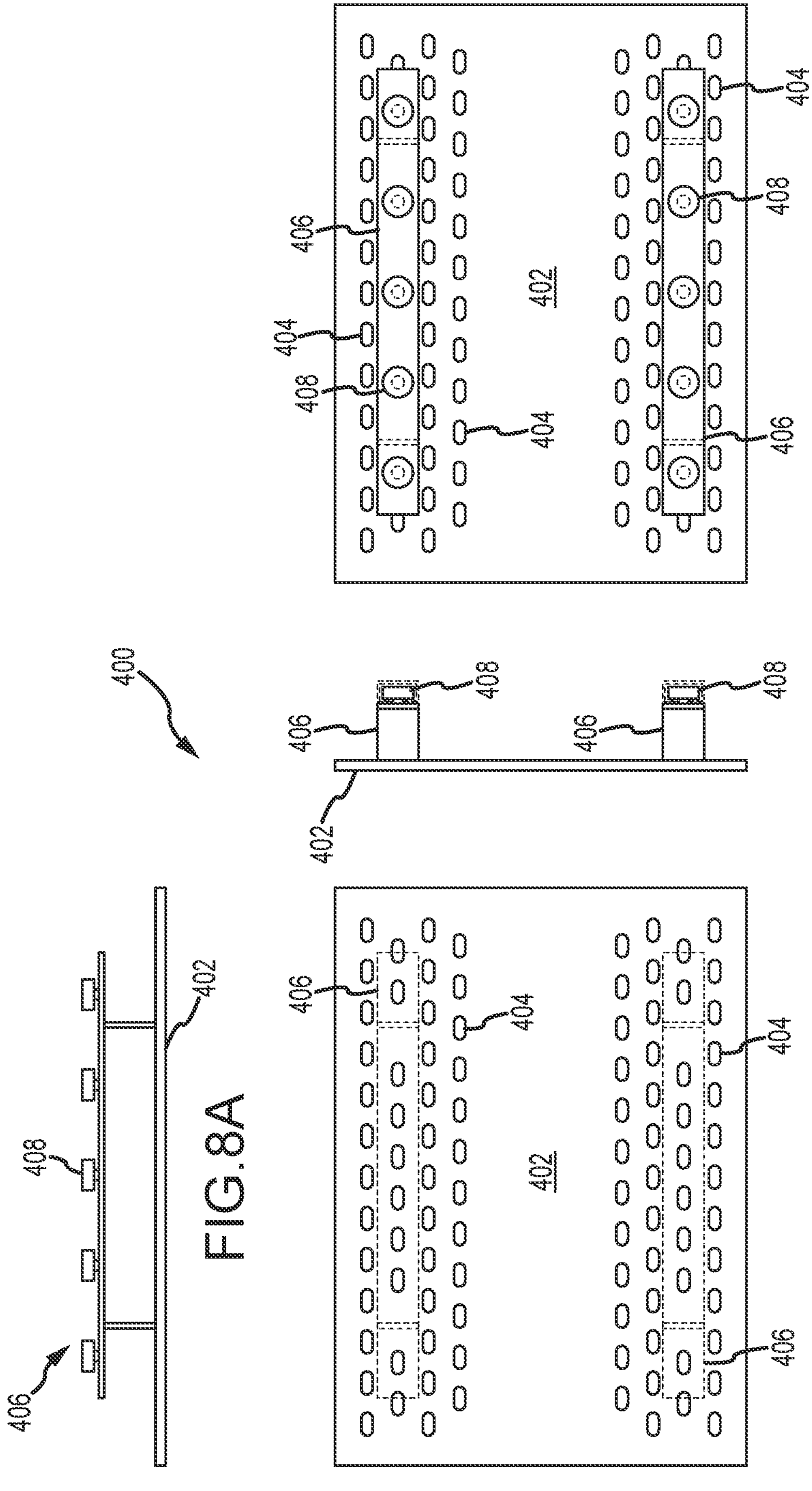
FIGS. 8A-D include plan (FIG. 8A), front (FIG. 8B), side (FIG. 8C), and back (FIG. 8D) views of an embodiment of a universal mounting apparatus having a roller guide mounting feature.
Figure 12:
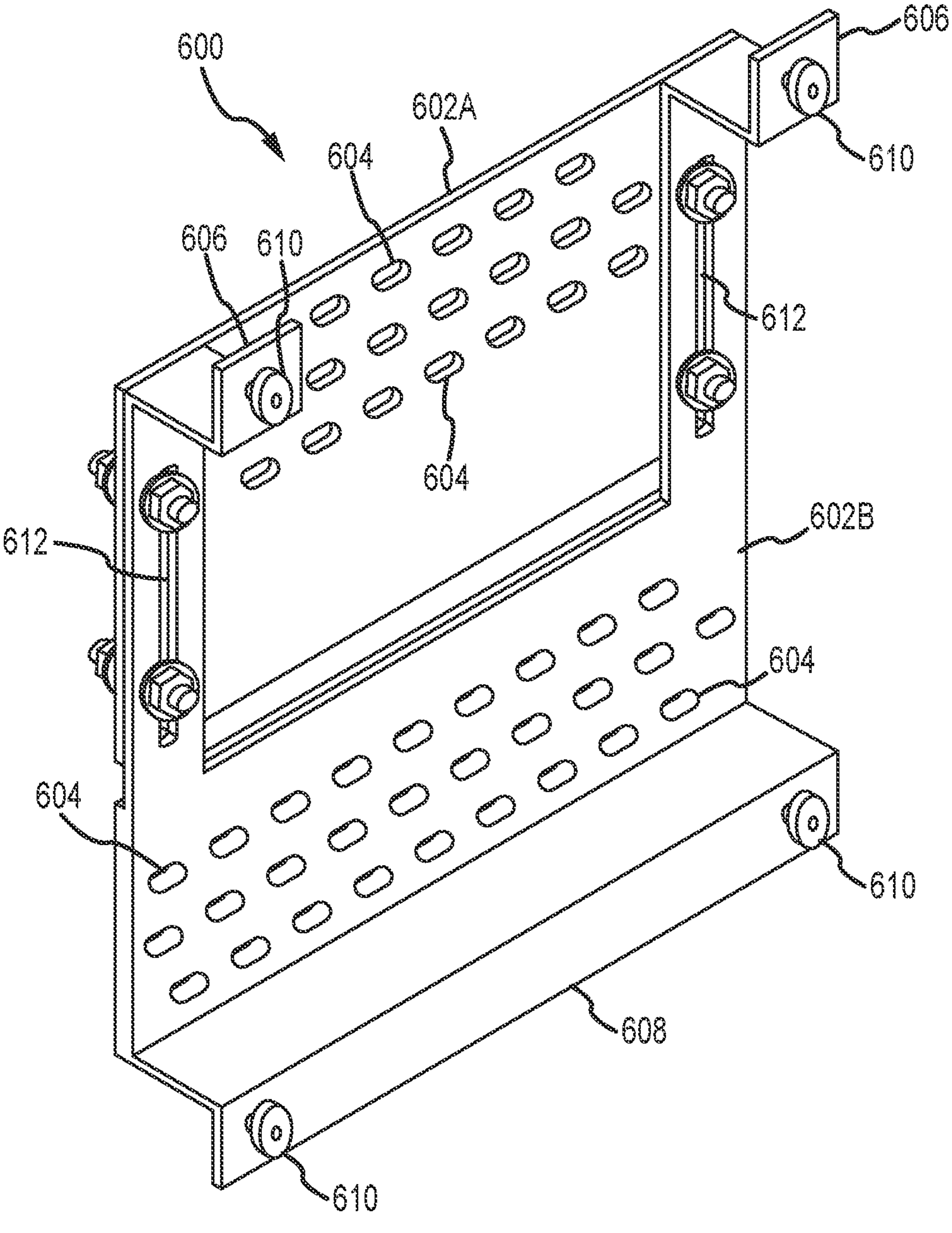
FIG. 12 is a rear perspective view of an embodiment of a universal mounting apparatus having a roller guide mounting feature and an adjustable mounting plate.

FIG. 8 includes plan (FIG. 8A), front (FIG. 8B), side (FIG. 8C), and back (FIG. 8D) views of an embodiment of a universal mounting apparatus 400 having a roller guide mounting feature. Although FIG. 8 does not include a rear perspective view, FIG. 12 is a rear perspective view of a similar mounting apparatus. Referring to FIG. 8, the mounting apparatus 400 generally includes, without limitation: a universal mounting plate 402 that defines the front surface or portion of the mounting apparatus 400; holes 404 formed in the mounting plate 402; and offset roller assemblies 406 that run horizontally in the front, plan, and back views of FIG. 8. The holes 404 are arranged in an appropriate pattern or array that is intended to accommodate a plurality of different RU fastener locations, as explained above. In certain embodiments, the holes 404 are generally arranged in an upper and lower array, although the holes 404 could be formed and distributed throughout the entirety of the mounting plate 402. Each offset roller assembly 406 includes one or more rollers 408, preferably a plurality of rollers 408 arranged in a line. The embodiment shown in FIG. 8 utilizes five rollers 408 per roller assembly 406, although more or less than five could be used. The offset roller assemblies 406 protrude from the back side of the mounting plate 402, such that the RU will be spaced away from the support structure after installation. See, for example, FIG. 12, which depicts similar roller assemblies extending from the back side of the mounting plate. The universal nature of the holes 404 allows the mounting apparatus 400 to compatibly mount to the RU component using, for example, threaded fasteners. Thereafter, the RU component can be mounted to the support structure (e.g., antenna structure) by sliding the rollers 408 into compatibly configured and spaced apart guide rails located on the support structure (see FIG. 1). Thereafter, the RU component can be secured to the guide rails using nuts, clips, locks, clamps, a locking plate, levers, or the like.

Figure 9C:
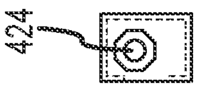
FIGS. 9A-C include plan (FIG. 9A), front (FIG. 9B), and side (FIG. 9C) views of an embodiment of a guide rail that is compatible with the universal mounting apparatus shown in FIG. 8.
Figure 9A:
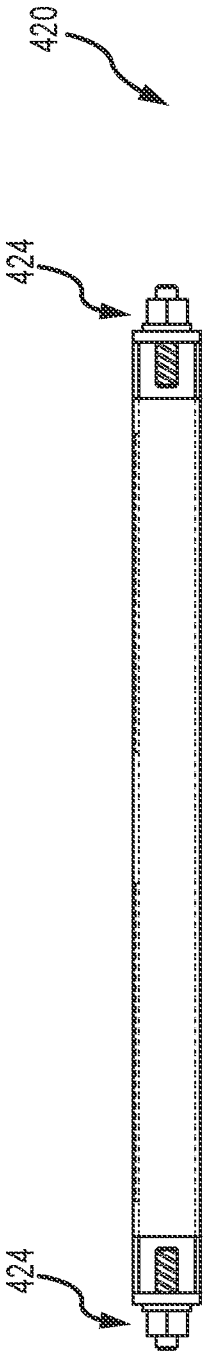
Figure 9B:
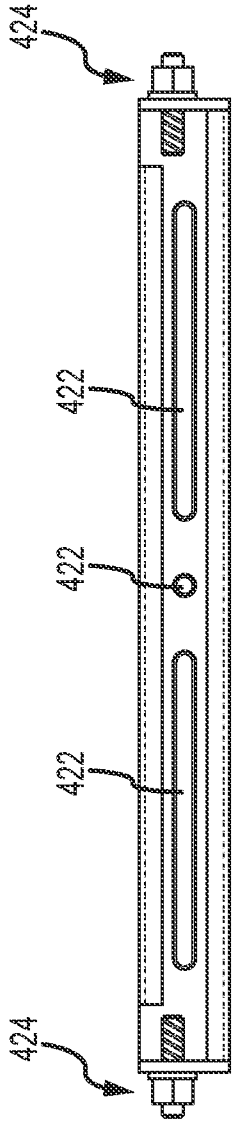

FIG. 9 includes plan (FIG. 9A), front (FIG. 9B), and side (FIG. 9C) views of an embodiment of a guide rail 420 that is compatible with the universal mounting apparatus 400 shown in FIG. 8. Two instances of the guide rail 420 are attached to (or integrated with) the support structure, and arranged in parallel at the desired spacing for compatibility with the spacing of the roller assemblies 406. The guide rail 420 includes holes 422, at least one slot, or other feature that accommodates mounting hardware to secure the guide rail 420 to the support structure, e.g., an antenna component. The guide rail 420 includes locking elements 424 (one for each end) to lock the rollers 408 in place after mounting the RU to the support structure. For example, the locking elements 424 may include a fastener, such as a bolt, an endcap or end plate, a latch, or the like. When installed as shown in FIG. 9, the locking elements 424 prevent the roller assembly 406 from sliding within the guide rail 420. Thus, the locking elements 424 retain the RU in its mounted position.

Figures 11A, 11B, 11C, 11D:
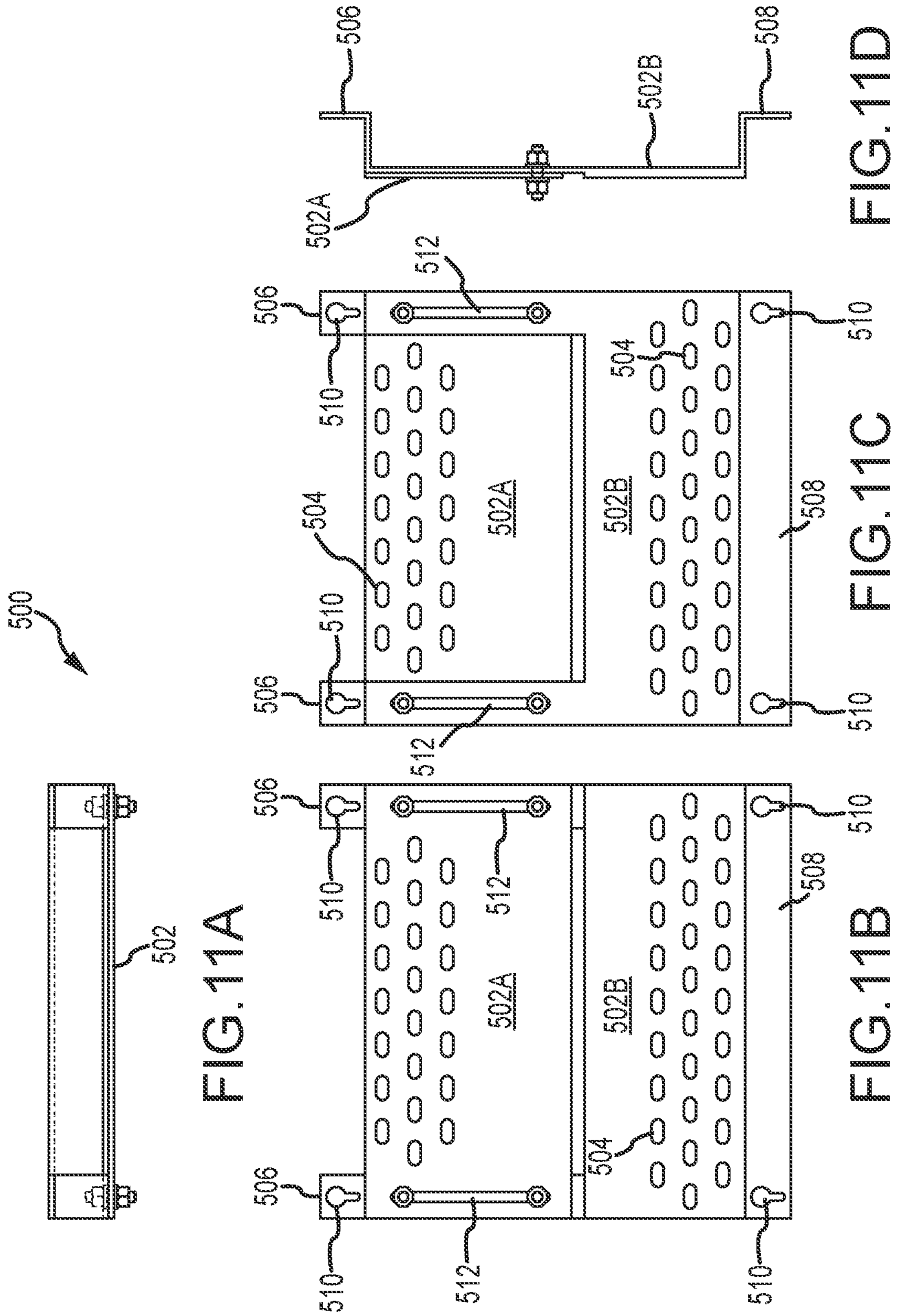
FIGS. 11A-D include plan (FIG. 11A), front (FIG. 11B), rear (FIG. 11C), and side (FIG. 11D) views of the universal mounting apparatus shown in FIG. 10.

FIG. 10 is a rear perspective view of an embodiment of a universal mounting apparatus 500 having a keyhole mounting feature and an adjustable mounting plate. FIG. 11 includes plan (FIG. 11A), front (FIG. 11B), rear (FIG. 11C), and side (FIG. 11D) views of the universal mounting apparatus 500. The mounting apparatus 500 generally includes, without limitation: an adjustable universal mounting plate 502 that defines the front surface or portion of the mounting apparatus 500; holes 504 or openings formed in the mounting plate 502; at least one offset upper flange 506; at least one offset lower flange 508; and holes 510 (e.g., slots or keyholes) formed in the offset flanges 506, 508. The holes 504 are arranged in an appropriate pattern or array that is intended to accommodate a plurality of different RU fastener locations, as explained above. In certain embodiments, an upper array of holes 504 is formed in an upper portion 502A of the mounting plate 502 (e.g., one mounting plate section), and a lower array of holes 504 is formed in a lower portion 502B of the mounting plate (e.g., another mounting plate section). The two arrays may include the same or different patterns of openings. The offset flanges 506, 508 protrude from the back side of the mounting plate 502, such that the RU will be offset from the support structure after installation.

In contrast to the mounting apparatus 300 depicted in FIG. 7 (which includes a fixed or stationary mounting plate 302), the mounting plate 502 of the mounting apparatus 500 is slidably adjustable, such that the two respective mounting plates are couplable to each other. In this regard, the upper portion 502A and/or the lower portion 502B can move in at least one dimension relative to the other. In accordance with the illustrated embodiment, the upper portion 502A is slidably adjustable relative to the lower portion 502B. As shown in FIG. 10 and FIG. 11, the upper and lower portions 502A, 502B include adjustment slots 512 that are shaped and sized to accommodate retaining elements or adjustment fasteners, such as threaded fasteners. When the fasteners are loosened, the upper portion 502A can be moved up and down relative to the lower portion 502B. When the fasteners are tightened, the position of the upper portion 502A is locked, relative to the lower portion 502B. Accordingly, at least one adjustment fastener is accommodated by at least one adjustment slot to facilitate slidable adjustment of the upper portion 502A relative to the lower portion 502B. This increases the flexibility and compatibility of the mounting plate 502. Although not shown, a universal mounting apparatus of the type disclosed here may be adjustable in a plurality of directions (e.g., vertically, horizontally, diagonally, etc.), and may have any number of degrees of freedom. Furthermore, embodiments of the mounting apparatus 500 may be configured such that the positions of the holes 510 are adjustable in at least one dimension.

Figures 13A, 13B, 13C, 13D:
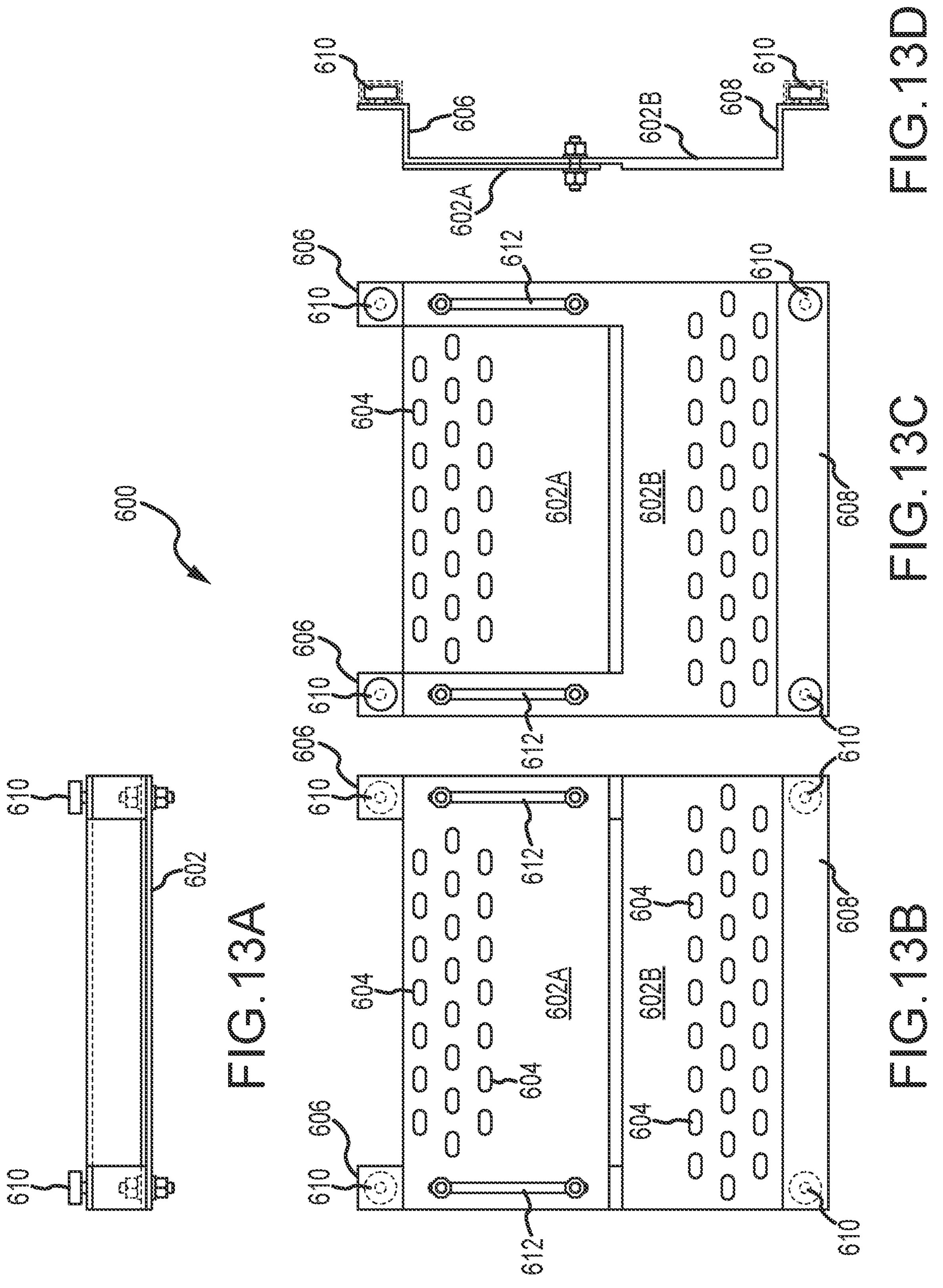
FIGS. 13A-D include plan (FIG. 13A), front (FIG. 13B), rear (FIG. 13C), and side (FIG. 13D) views of the universal mounting apparatus shown in FIG. 12.

FIG. 12 is a rear perspective view of an embodiment of a universal mounting apparatus 600 having a guide rail mounting feature (e.g., a roller guide) and an adjustable mounting plate, and FIG. 13 includes plan (FIG. 13A), front (FIG. 13B), rear (FIG. 13C), and side (FIG. 13D) views of the universal mounting apparatus 600. The mounting apparatus 600 generally includes, without limitation: an adjustable universal mounting plate 602 that defines the front surface or portion of the mounting apparatus 600; holes 604 or openings formed in the mounting plate 602; at least one offset upper flange 606; at least one offset lower flange 608; and rollers 610 or equivalent gliding or sliding features formed in the offset flanges 606, 608. In practice, the mounting apparatus may include one elongated upper flange instead of two small flanges as shown. Moreover, more than two rollers 610 can be used for each row (upper and lower). The holes 604 are arranged in an appropriate pattern or array that is intended to accommodate a plurality of different RU fastener locations, as explained above. In certain embodiments, an upper array of holes 604 is formed in an upper portion 602A of the mounting plate 602, and a lower array of holes 604 is formed in a lower portion 602B of the mounting plate 602. The two arrays may include the same or different patterns of openings. The offset flanges 606, 608 protrude from the back side of the mounting plate 602, such that the RU will be offset from the support structure after installation.

In contrast to the mounting apparatus 400 depicted in FIG. 8 (which includes a one-piece, fixed or stationary mounting plate 402), the mounting plate 602 of the mounting apparatus 600 is slidably adjustable, such that the two respective mounting plates are couplable to each other. In this regard, the upper portion 602A and/or the lower portion 602B can move in at least one dimension relative to the other. In accordance with the illustrated embodiment, the upper portion 602A is slidably adjustable relative to the lower portion 602B. As shown in FIG. 12 and FIG. 13, the upper and lower portions 602A, 602B include adjustment slots 612 that are shaped and sized to accommodate retaining elements or adjustment fasteners, such as threaded fasteners. When the fasteners are loosened, the upper portion 602A can be moved up and down relative to the lower portion 602B. When the fasteners are tightened, the position of the upper portion 602A is locked, relative to the lower portion 602B. Accordingly, at least one adjustment fastener is accommodated by at least one adjustment slot to facilitate slidable adjustment of the upper portion 602A relative to the lower portion 602B. This increases the flexibility and compatibility of the mounting plate 602. Although not shown, a universal mounting apparatus of the type disclosed here may be adjustable in a plurality of directions (e.g., vertically, horizontally, diagonally, etc.), and may have any number of degrees of freedom. Furthermore, embodiments of the mounting apparatus 600 may be configured such that the positions of the rollers 610 are adjustable in at least one dimension.

Figure 14:
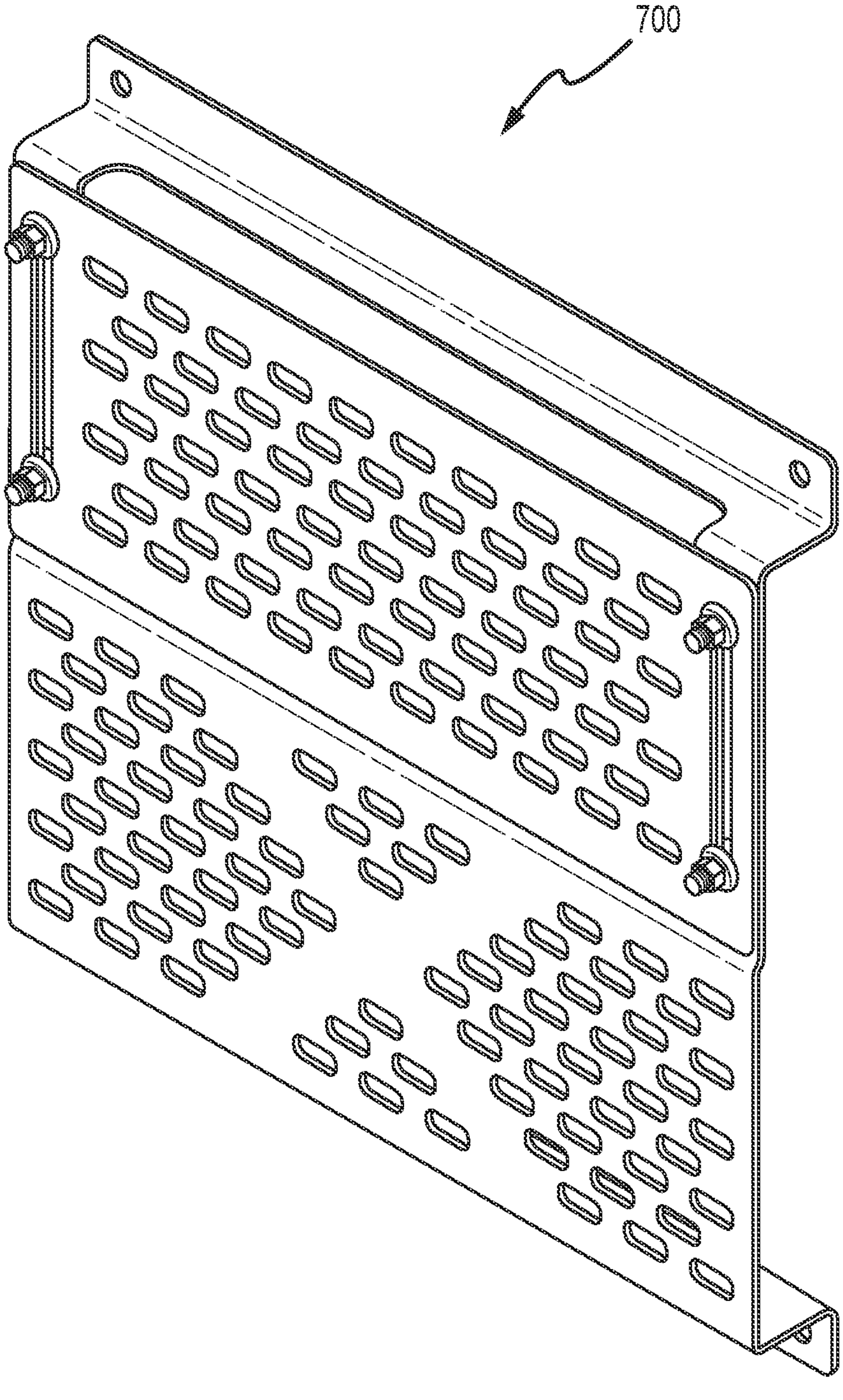
FIG. 14 is a front perspective view of an embodiment of an adjustable mounting plate suitable for use with a universal mounting apparatus.
Figure 15:
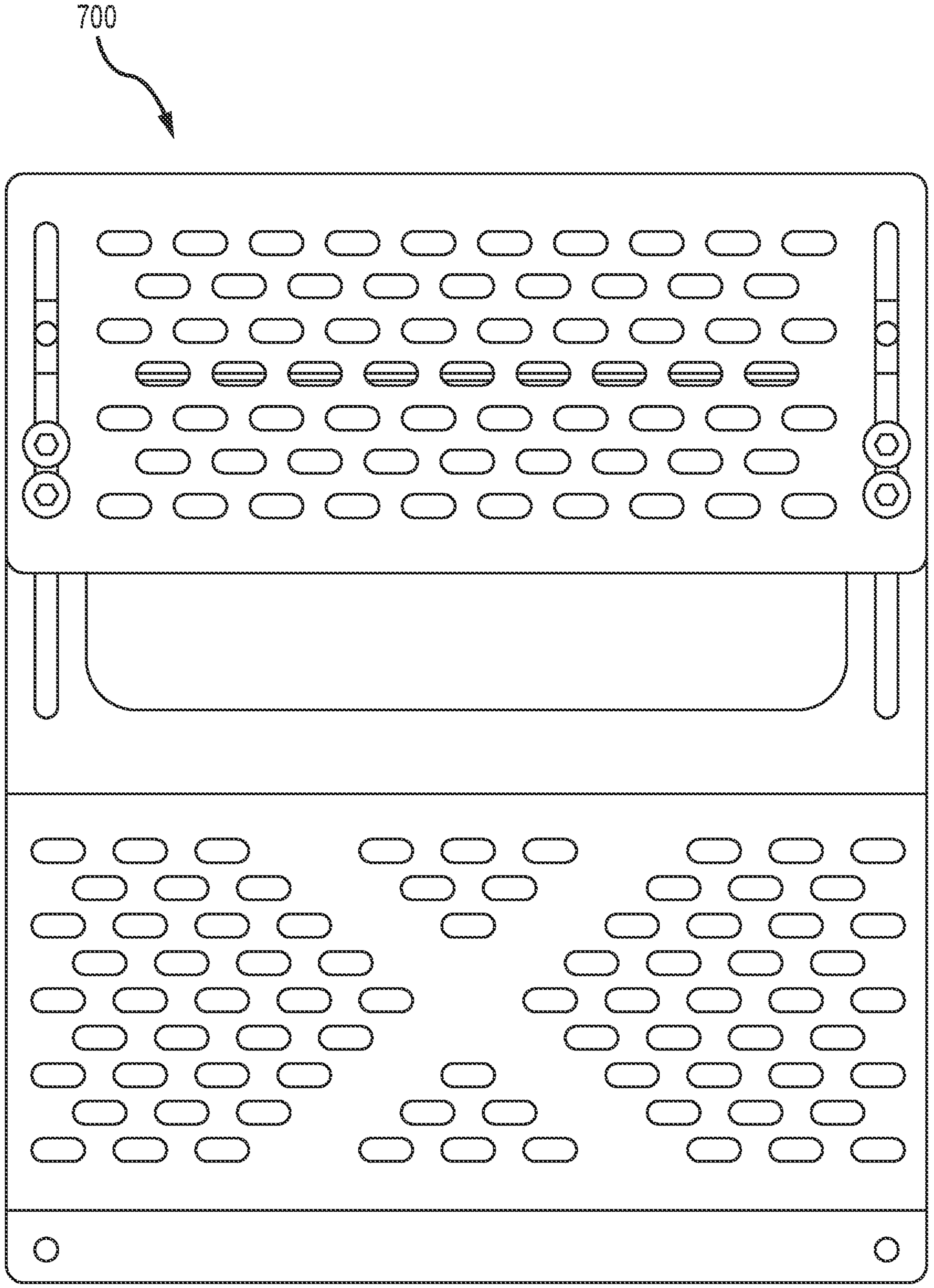
FIG. 15 is a front view of the adjustable mounting plate shown in FIG. 14, with the adjustable portion in a raised position.
Figure 16:
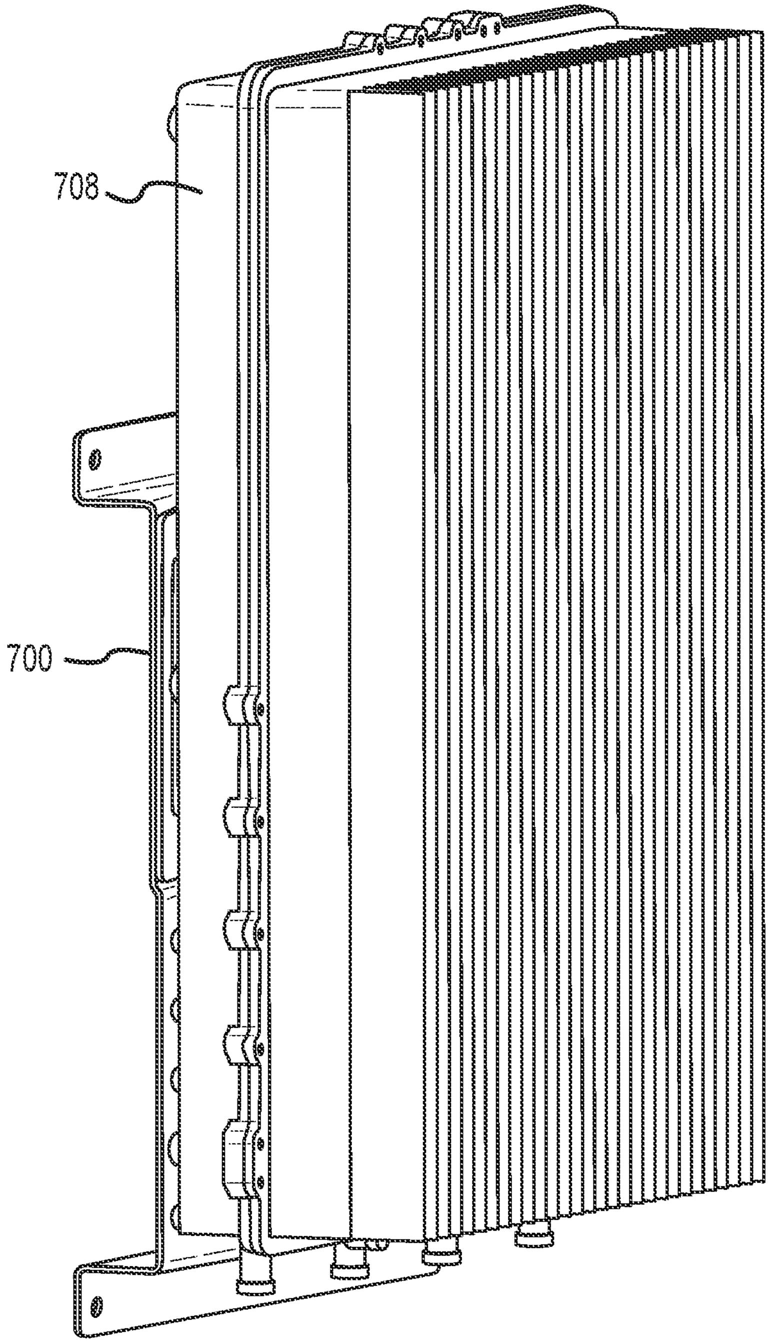
FIG. 16 is a front perspective view of an RU mounted to the adjustable mounting plate shown in FIG. 14 and FIG. 15.

FIG. 14 is a front perspective view of an embodiment of an adjustable mounting plate 700 suitable for use with a universal mounting apparatus (with the adjustable portion in a lowered position), and FIG. 15 is a front view of the adjustable mounting plate 700 (with the adjustable portion in a raised position). The mounting plate 700 includes one pattern of holes in the slidable upper portion, and a different pattern of holes in the lower portion. These and other hole patterns can be utilized in the mounting plates disclosed here. Moreover, the slidable upper portion may include two or more physically distinct sections (with patterns of openings) that are adjustable in at least one dimension relative to each other. Similarly, the lower portion may include two or more physically distinct sections (with patterns of openings) that are adjustable in at least one dimension relative to each other. FIG. 16 is a front perspective view of an RU 708 mounted to the adjustable mounting plate 700 shown in FIG. 14 and FIG. 15. The corresponding support structure is not shown in FIG. 16.

Figure 17A:
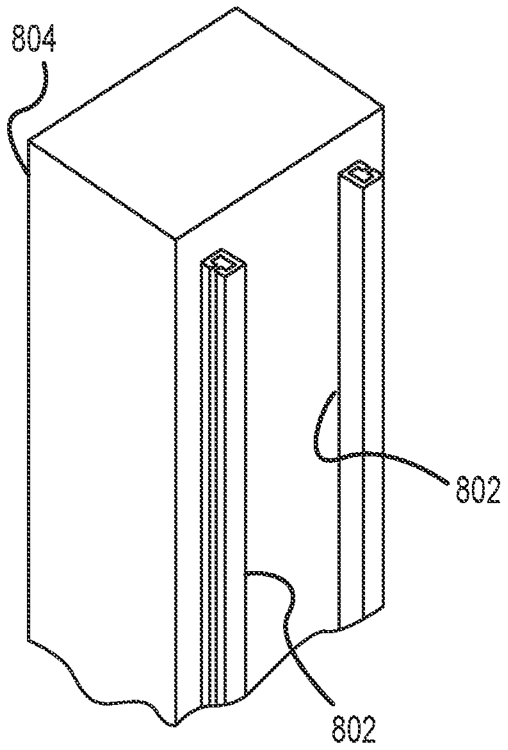
FIG. 17A is a front perspective view of a support structure having vertical guide channels.
Figure 17B:
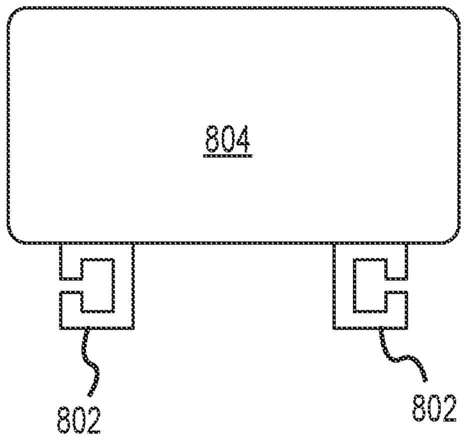
FIG. 17B is a top view of the support structure shown in FIG. 17A.
Figure 18A:
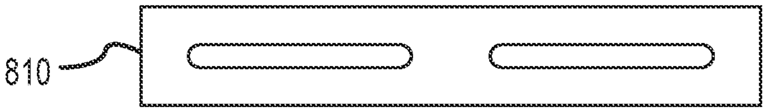
FIG. 18A is a front view of a mounting assembly that is compatible with the support structure shown in FIG. 17.
Figure 18B:
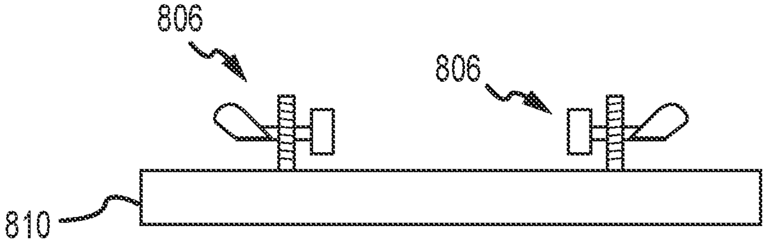
FIG. 18B is a top view of the mounting assembly shown in FIG. 18A.
Figure 19:
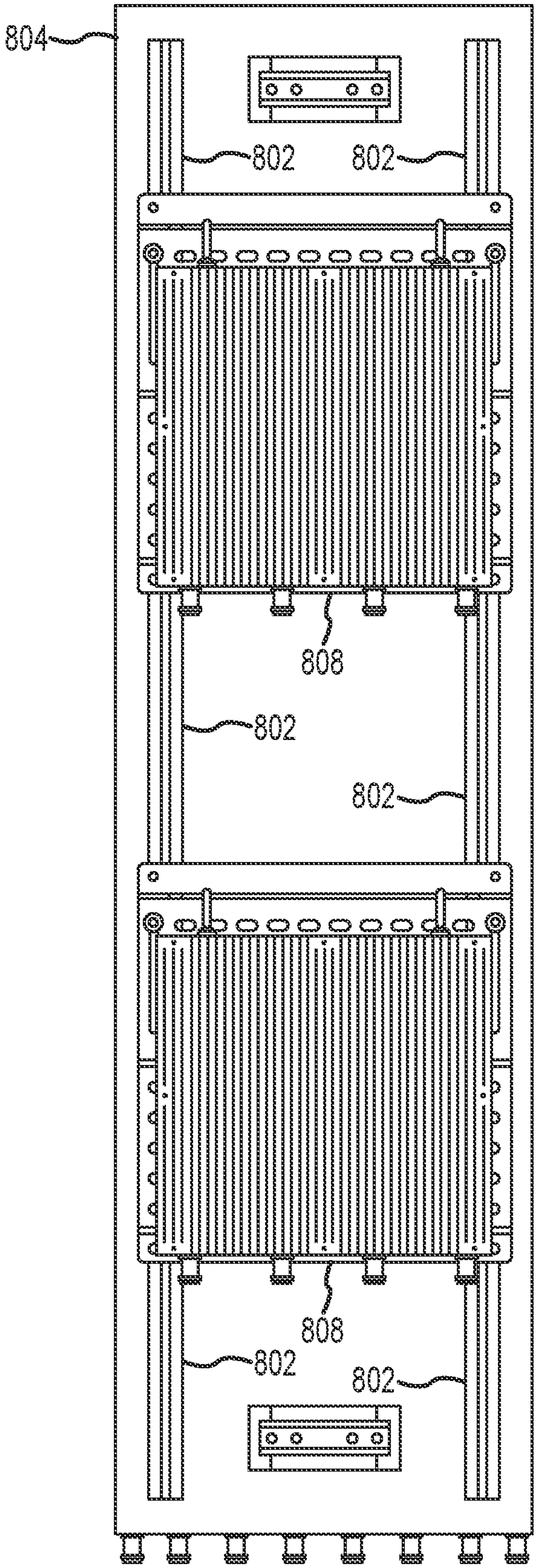
FIG. 19 is a front view of two RUs mounted to a support structure by way of a mounting system that utilizes vertical guide channels.

FIG. 17 shows components of a mounting system that utilizes vertical guide channels and slidable lock elements. FIG. 17A is a front perspective view of a section of a support structure 804 with two vertical guide rails 802, and FIG. 17B is a top view of the support structure 804. FIG. 18A is a front view of a mounting assembly 810, and FIG. 18B is a top view of the mounting assembly 810. FIG. 19 is a front view of two RUs mounted to a support structure by way of a mounting system that utilizes vertical guide channels.

For the illustrated implementation, two vertical guide rails 802 are attached to (or integrated with) the support structure 804. The guide rails 802 are spaced apart by a specified distance for compatibility with the spacing of corresponding mounting fixtures 806 located on the RUs 808. Each guide rail 802 defines a slot or a channel that receives at least one of the mounting fixtures 806. The mounting fixtures 806 may, for example, resemble a bolt head that is latching, lockable, or otherwise movable from an unlocked position to a locked position.

When the mounting fixtures 806 are in the unlocked position, they can freely slide within the channels of the guide rails 802. This allows an installer to position and "drop" an RU 808 into the guide rails from the upper end of the guide rails. The RU 808 can then be moved up or down within the guide rails 802 until it is located in the desired vertical position. At that time, the mounting fixtures 806 can be latched, manipulated, or otherwise actuated into their locked positions to secure them in position within the guide rails 802 and, consequently, to hold the RU 808 in the desired vertical position. FIG. 18 depicts front and top views of a mounting assembly 810 that includes at least two of the mounting fixtures 806. At least one instance of the mounting assembly 810 is attached to (or integrated with) the RU 808. In certain embodiments, at least two instances of the mounting assembly 810 are attached to the RU 808: an upper mounting assembly 810 and a lower mounting assembly 810, resulting in four mounting fixtures 806 that are actuated to lock the RU 808 in place relative to the guide rails 802. In some embodiments, the mounting fixtures 806 can be incorporated into a universal mounting plate of the type described above, to accommodate different RU components.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A universal mounting apparatus to mount a transceiver radio unit to an antenna structure of a cellular communication system, the antenna structure having a guide rail system having channels defined therein, the universal mounting apparatus comprising:

a first mounting plate having an adjustment slot and one or more guides configured to slide within the channels defined in the guide rail system of the antenna structure;

a second mounting plate couplable to the first mounting plate, the second mounting plate comprising a plurality of openings arranged in a first pattern, wherein the first pattern is compatible with a plurality of different mounting fastener locations each corresponding to a plurality of different transceiver radio unit types; and at least one adjustment fastener, wherein the at least one adjustment slot of the first mounting plate and at least one of the plurality of openings of the second mounting plate are configured to receive the at least one adjustment fastener, and wherein the at least one adjustment fastener is configured to prohibit slidable adjustment of the second mounting plate relative to the first mounting plate while the at least one adjustment fastener is tightened, and to facilitate slidable adjustment of the second mounting plate relative to the first mounting plate while the transceiver radio unit is coupled to the second mounting plate while the at least one adjustment fastener is not tightened.

2. The universal mounting apparatus of claim 1 wherein the at least one adjustment fastener is configured to be loosened to allow a position of the second mounting plate to move relative to the first mounting plate and to be tightened to lock the position of the second mounting plate relative to the first mounting plate.

3. The universal mounting apparatus of claim 2, wherein the adjustment slot is an elongated channel configured to receive the at least one adjustment fastener and to permit linear movement of the at least one adjustment fastener and the second mounting plate relative to the first mounting plate in a direction parallel to the elongated channel when the at least one adjustment fastener is loosened.

4. The universal mounting apparatus of claim 1, wherein the second mounting plate comprises at least two physically distinct sections that are adjustable in at least one dimension relative to each other.

5. The universal mounting apparatus of claim 4, wherein the second mounting plate comprises an upper mounting plate section and a physically distinct lower mounting plate section.

6. The universal mounting apparatus of claim 1, wherein the first mounting plate comprises mounting holes arranged in a fixed pattern compatible with a fastener configuration of the antenna structure.

7. The universal mounting apparatus of claim 1, wherein the at least one adjustment fastener comprises a plurality of threaded fasteners.

8. The universal mounting apparatus of claim 1, wherein the first mounting plate comprises at least one offset flange to facilitate mounting to the antenna structure.

9. The universal mounting apparatus of claim 8, wherein the at least one offset flange protrudes from a back side of the first mounting plate such that the transceiver radio unit is offset from the antenna structure after installation.

10. A universal mounting apparatus to mount any of a plurality of different transceiver radio unit types to an antenna structure of a cellular communication system, the universal mounting apparatus comprising:

a first mounting plate comprising an adjustment slot formed therein and having at least one guide configured to slide within a guide rail system of the antenna structure;

a second mounting plate couplable to the first mounting plate, the second mounting plate comprising a plurality of openings compatible with each of the plurality of different transceiver radio unit types; and at least one adjustment fastener wherein the at least one adjustment slot of the first mounting plate and at least one of the plurality of openings of the second mounting plate are configured to receive the at least one adjustment fastener, and wherein the at least one adjustment fastener is configured to prohibit slidable adjustment of the second mounting plate relative to the first mounting plate while the at least one adjustment fastener is tightened, and to facilitate slidable adjustment of the second mounting plate relative to the first mounting plate while the transceiver radio unit is coupled to the second mounting plate while the at least one adjustment fastener is not tightened.

11. The universal mounting apparatus of claim 10, wherein the adjustment slot of the first mounting plate and at least one of the plurality of openings of the second mounting plate accommodate the at least one adjustment fastener.

12. The universal mounting apparatus of claim 11 wherein the at least one adjustment fastener is configured to be loosened to allow a position of the second mounting plate to move relative to the first mounting plate and to be tightened to lock the position of the second mounting plate relative to the first mounting plate.

13. The universal mounting apparatus of claim 10, wherein:

the first mounting plate comprises at least one offset flange to facilitate mounting to the antenna structure; and the at least one offset flange protrudes from a back side of the first mounting plate such that the transceiver radio unit is offset from the antenna structure after installation.

14. The universal mounting apparatus of claim 13 wherein the adjustment slot is an elongated channel formed in the first mounting plate to receive the adjustment fastener and to permit linear movement of the at least one adjustment fastener and the second mounting plate relative to the first mounting plate in a direction parallel to the elongated channel when the at least one adjustment fastener is loosened.

15. The universal mounting apparatus of claim 10, wherein the at least one adjustment slot is an elongated channel formed in the first mounting plate to receive the at least one adjustment fastener and to permit linear movement of the at least one adjustment fastener and the second mounting plate relative to the first mounting plate in a direction parallel to the elongated channel when the at least one adjustment fastener is loosened.

16. The universal mounting apparatus of claim 10, wherein the second mounting plate comprises at least two physically distinct sections that are adjustable in at least one dimension relative to each other.

17. The universal mounting apparatus of claim 16, wherein the second mounting plate comprises an upper mounting plate section and a physically distinct lower mounting plate section.

18. The universal mounting apparatus of claim 10, wherein the first mounting plate comprises mounting holes arranged in a fixed pattern compatible with a fastener configuration of the support structure.

19. The universal mounting apparatus of claim 10, wherein the first mounting plate comprises at least one offset flange to facilitate mounting to the support structure.

20. The universal mounting apparatus of claim 19, wherein the at least one offset flange protrudes from a back side of the first mounting plate such that the transceiver radio unit is offset from the support structure after installation.

* * * * *